Patented July 13, 1937

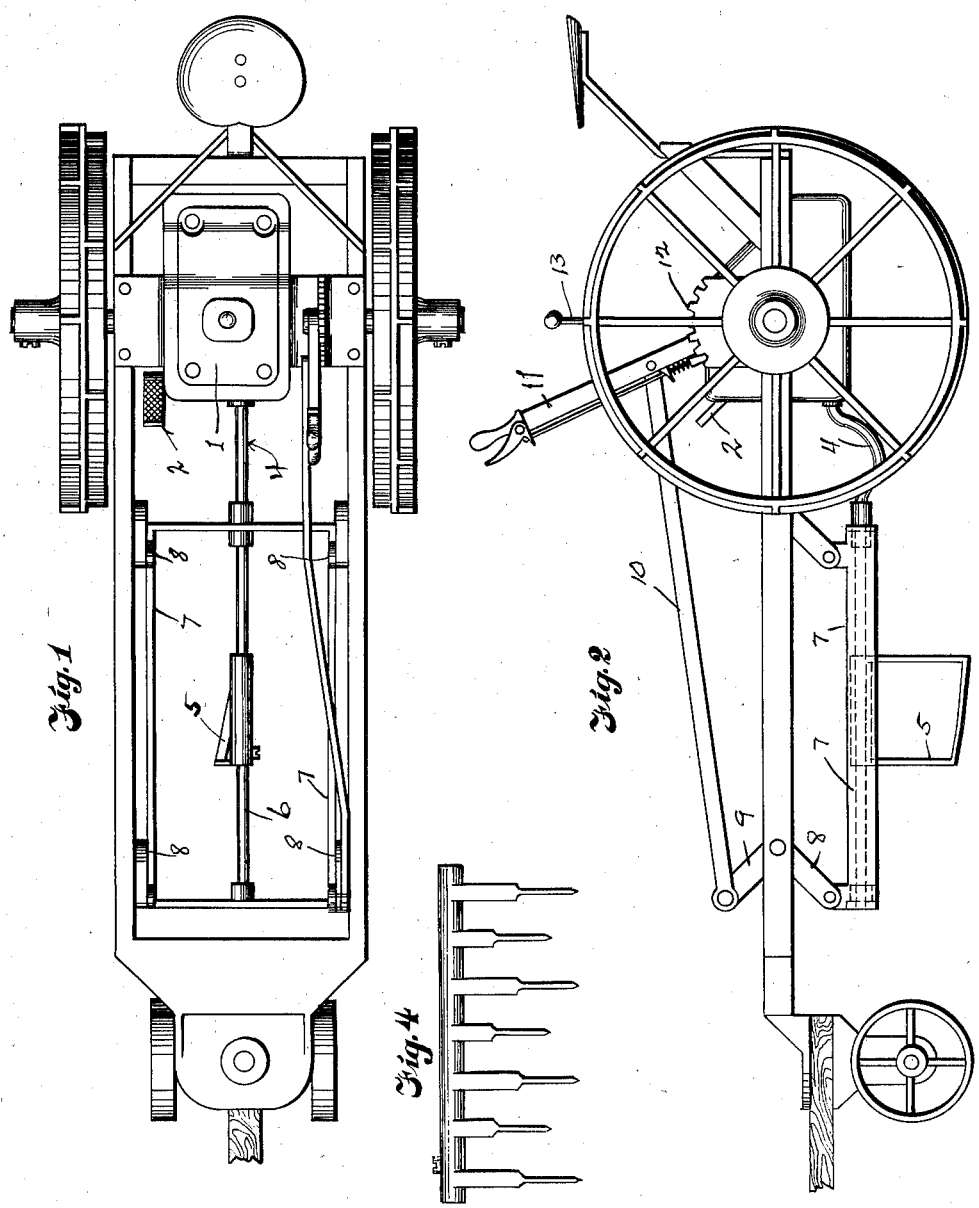

2,087,035

UNITED STATES PATENT OFFICE 2,087,035

CULTIVATOR

Robert E. Ledbetter and Edwin Ledbetter, Montgomery, Ala.

Application August 6, 1936, Serial No. 94,519

3 Claims. (Cl. 97—15)

The invention relates to agricultural machinery or apparatus intended to block out and cultivate plants, particularly cotton plants, planted in rows; and the object of the invention is to provide a novel, useful, inexpensive and most practical apparatus for blocking out from such rows those plants of the stand not intended to mature and for cultivating plants left standing. The object is attained in a remarkable degree by the means and apparatus to be described.

In the drawing Fig. 1 is a top view or plan view of the apparatus embodying my invention, Fig. 2 is a side elevation, Fig. 3 a rectilinear perspective of the hoe, or cutting implement, while Fig. 4 is a side elevation of another type of cultivating or earth agitating implement which for convenience may be called a rake.

In the drawing, in Fig. 1, 1 is a gear box, which may have gear shift and clutch, and which, since of the well known type used on automobiles, trucks and motor driven agricultural machinery, needs no detailed description beyond the term gear box. It is wholly a matter of preference what type of gearing is used. We prefer a gear box with gear shift and clutch, so while the apparatus moves down a row the gear ratio may be changed, if desired; the flexible shaft (presently to be described) stopped, or the rotating hoe, rake, or, generally the implement arranged to disturb the earth, raised or lowered without stoppage of the moving parts or of the apparatus. At 2 is a foot pedal, of usual type, arranged to throw gears in or out of engagement, and is assumed to operate a clutch of equivalent device, not shown, as it is of ordinary type involving no novelty. 13 is the gear shift lever, of usual type. 4 is a flexible shaft, protected by the usual flexible housing so as to protect it from dirt, moisture, etc. and which needs no detailed description. 5 is the earth agitator, or tool, here shown as a kind of hoe—see also Fig. 3. 6 is a shaft arranged to carry and drive the implement or tool 5, and shaft 6 is carried by a frame 7, 7 (see also 7, 7, Fig. 2) suspended by links as at 8, 8, (see also Fig. 2) from the main frame of the apparatus. By means of an arm 9 and link 10 the frame 7, 7, and with it the driven shaft 6, can be raised or lowered by movement of a hand lever 11, capable of being locked in various positions for which end a toothed sector is provided as at 12. Such sectors are sufficiently well known in agricultural implements to need no further description. The operator of the apparatus, thus, by movement of the lever 11, can raise or lower the shaft 6, and, of course, the tool 5, so as to take no cut, or a shallow or deep cut, as desired. In rows of varied elevation this is a valuable feature for it is frequently desirable to vary the depth of cut of the tool or hoe 5. Obviously setting the frame 7, 7, at any of its possible adjustments does not affect the flexible shaft drive.

Figs. 3 and 4 are merely views, respectively, of a hoe and rake tool, equivalent to 5 of Figs. 1 and 2. Fig. 4 is on an enlarged scale.

Manifestly by proper gear ratio selection the shaft 6 may be driven to make whatever number of revolutions are desirable to one revolution of the large wheels of the apparatus, by which large wheels the shaft 6 is driven through the gear box. Also, assuming two or three possible gear ratios with a given gear set, the ratio of turns of shaft 6 to shaft of large wheels can be set at as many values. This is, perhaps, perfectly obvious and needs no explanation to anyone familiar with gear trains.

If desired ploughs can be carried by the frame but would not, of course, be part of the invention herein claimed. A common expedient for varying the tread is indicated in the drawing, this being the extended hubs, which, when reversed in position, say inside instead of outside, as shown, increase the width of tread. This will be understood without detail as it is well known and not claimed herein.

Having described our invention, what we claim is:—

1. The combination with a wheeled frame, of links suspended from said frame, a lever arranged to govern the inclination of said links, a detent arranged to hold said lever in any of a variety of positions, a longitudinal shaft supported by said links, a flexible shaft connected to said longitudinal shaft and arranged to be driven by one of the wheels of said frame through a gear box, and cutters carried by said longitudinal shaft and arranged to cut transversely to the longer dimension of said frame, substantially as set forth.

2. The combination with a frame, of wheels arranged to support said frame, of links hinged on said frame, one of said links having an upwardly extended arm, a lever connected to said arm, a detent arranged to hold said lever in any of a plurality of positions, a longitudinal shaft supported at the lower ends of said links, cutters carried by said shaft, and a flexible shaft conected to said longitudinal shaft through a gear box and arranged to be driven by one of the wheels of said frame, substantially as set forth.

3. In a cultivator of the class described, the combination with a longitudinal cutter shaft arranged to be driven by one of the cultivator wheels through a gear box and a flexible shaft, of links arranged to support said longitudinal shaft, an arm extended upwardly from one of said links, a lever linked to said arm, and means arranged to hold said lever in any one of a plurality of positions, substantially as set forth.

ROBERT E. LEDBETTER.
EDWIN LEDBETTER.